R. T. NEWTON.
AUTOMOBILE LOCK.
APPLICATION FILED MAR. 22, 1917.

1,430,463.

Patented Sept. 26, 1922.
2 SHEETS—SHEET 1.

Witness:
Titus H. Irons

Inventor
RICHARD T. NEWTON
by his Attorneys

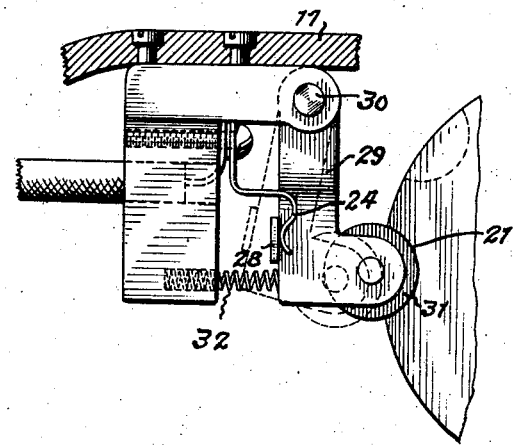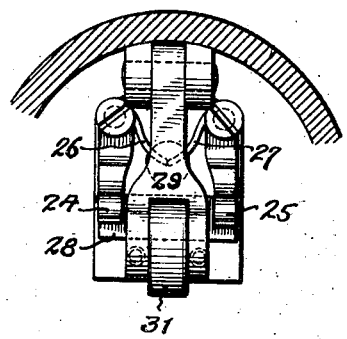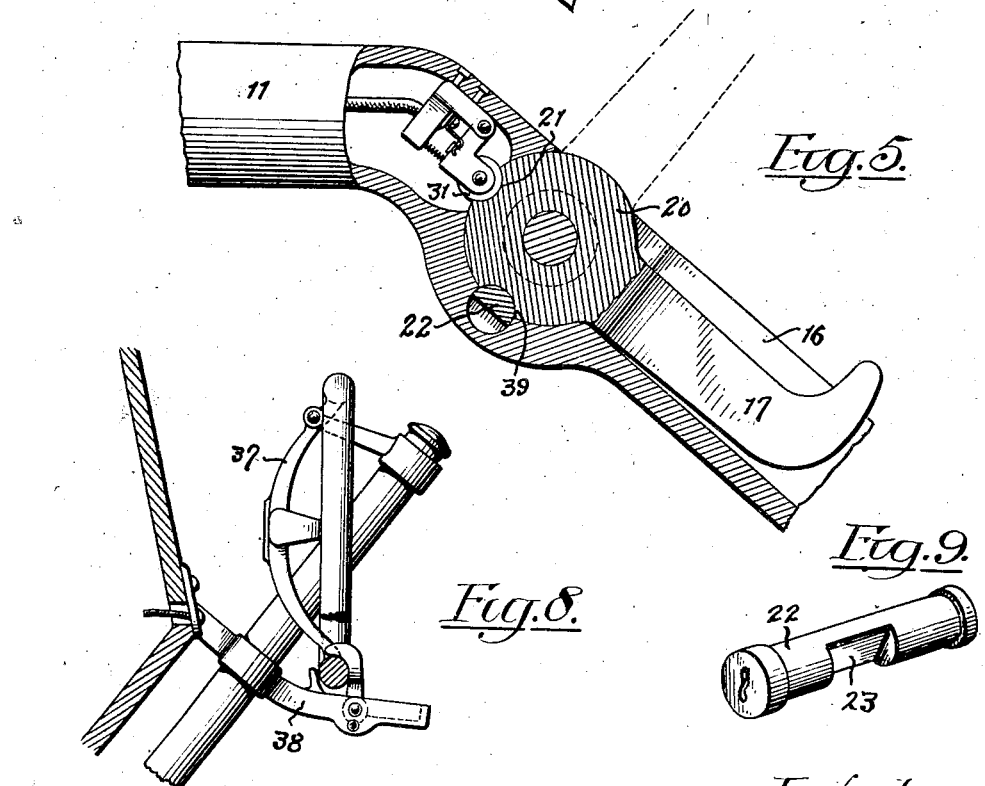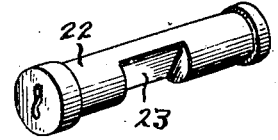

Patented Sept. 26, 1922.

1,430,463

UNITED STATES PATENT OFFICE.

RICHARD T. NEWTON, OF NEW YORK, N. Y.

AUTOMOBILE LOCK.

Application filed March 22, 1917. Serial No. 156,682.

*To all whom it may concern:*

Be it known that I, RICHARD T. NEWTON, a citizen of the United States of America, and residing in the city, county, and State of New York, have invented a certain new and useful Improvement in Automobile Locks, of which the following is a specification.

My invention relates to an automobile lock and particularly to a device adapted to protect a car against easy theft when the car is left unguarded temporarily on the street. The object of my invention is to provide a locking device which may be installed in an inconspicuous position without interfering with any of the various appliances now common on automobiles, and without interfering in any way with the operation of the steering or other mechanism of the car.

In the accompanying drawings.

Figure 1:
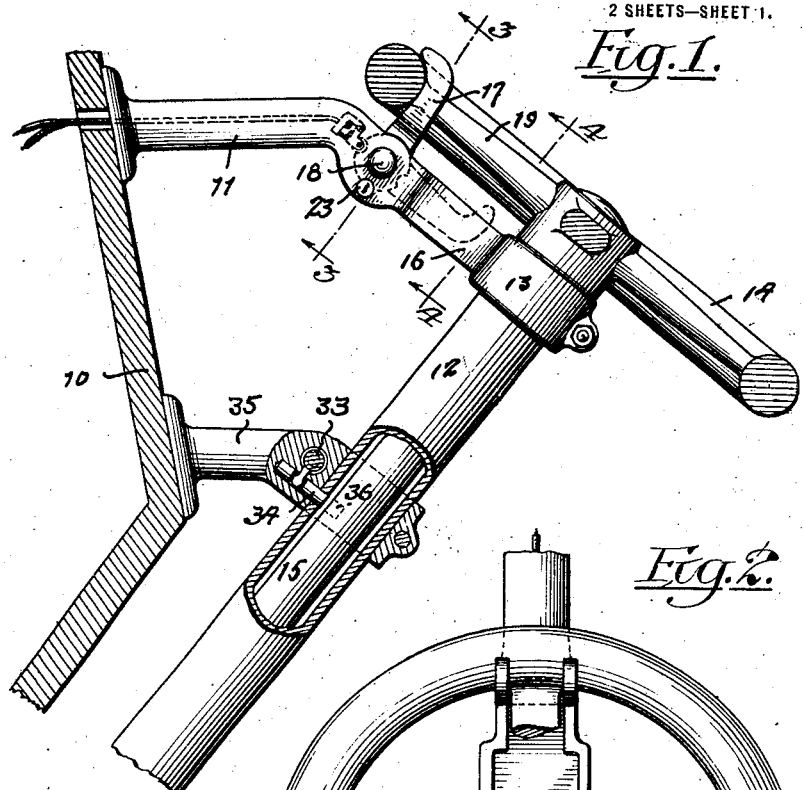
Fig. 1 is a partial section through a steering post and dash of a car in which my invention is embodied in one form.
Figure 2:
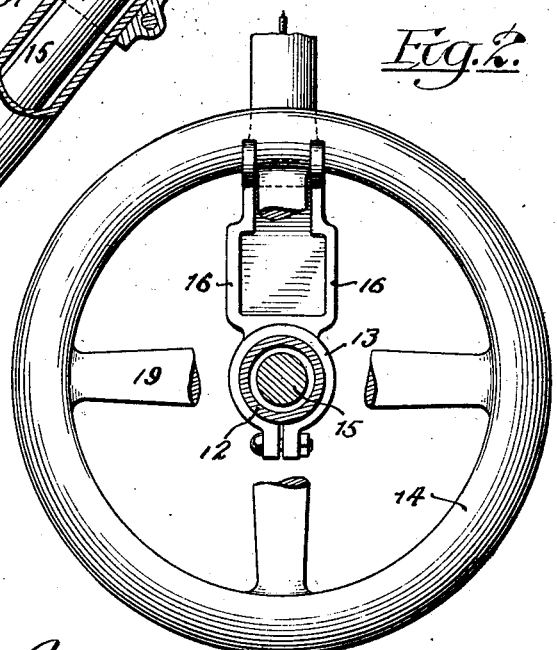
Fig. 2 is a broken plan of the steering wheel and supporting bracket.
Figure 3:
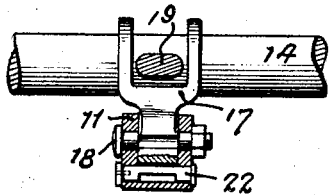
Figure 4:
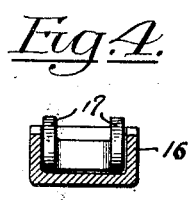

Figs. 3 and 4 are sections on the lines 3.3 and 4.4, Fig. 1 respectively;

Fig. 5 is a section through the bracket showing the locking mechanism;

Fig. 6 is an enlarged view of a detail showing the operation of the switch;

Fig. 7 is a plan of the latter;

Fig. 8 is a broken elevation showing the application of the invention, a modified arrangement of the steering wheel; and Fig. 9 is a perspective of the locking bolt by itself.

Locking devices heretofore employed for securing automobiles against theft while standing usually embody some locking bolt device mounted on the steering post and engaging the steering wheel or its shaft. These devices are frequently of clumsy construction and without exception add an element of clumsy appearance to this portion of the car and not infrequently constitute an objectionable obstruction to the operating apparatus. My invention contemplates the utilization of the bracket provided to steady the steering post for supporting the locking lever and switch mechanism either one or both of which may be employed to accomplish the desired result.

In the form here illustrated, the dash or car body 10 supports a hollow bracket 11 extending to the steering post 12 to which it is secured by a clamping collar 13. This bracket ordinarily lies in proximity to the steering wheel 14, the shaft 15 of which passes down through the steering column in well understood manner. The present bracket 11 comprises a tubular section extending from the dash 10 to a point adjacent the steering wheel, at which point it changes to a branched or troughed construction, the opposite sides 16 of which merge into the split clamping ring 13. Between these branches 16 and at a point adjacent the rim of the steering wheel 14 I mount a forked lever 17, pivoted at 18 to the bracket and normally lying in the position indicated in dotted lines in Fig. 1. The ends of the fork 17 are spaced apart a sufficient distance to embrace between them a spoke 19 and are claw-shaped so as to fit over the upper surface of the steering wheel 14 when the lever is swung into locking position. At its inner end the lever 17 has a hub 20 (Fig. 5) in which is a groove 21 substantially parallel to the axis of the hub and adapted to be engaged by the bolt 22 of the lock 23 located in the bracket 11 at a point adjacent the hub 20. The locking bolt is a rotary cylinder having a cross channel 23 forming a freeway through which the hub 20 may freely pass when the lever is being swung into locking position and rotatable by a key or other suitable mechanism into position to engage the groove 21 in the lever hub when the lever is in locking position.

While the lever in itself may afford satisfactory protection against theft of the car, since it effectually prevents the operation of the steering mechanism, I prefer to supplement it by a further safe-guard in the form of a cut-out in the ignition circuit, automatically operated by the throwing of the locking lever into engagement with the steering wheel. In the form here shown this cut-out device comprises a pair of contacts 24 and 25 to which are connected the wires 26 and 27 in the ignition circuit and which are led to the contacts through the tubular bracket 11 so that they are constantly concealed and tampering therewith prevented. Bridging these contacts is a conductor plate 28 carried by a lever 29 pivoted at 30 and having at its free end an antifriction roller 31 adapted to bear against the hub 20 of the locking lever 17. In the normal position of the latter, that is to say, when it is out of locking engagement with the steering wheel, the groove 21 therein registers with the roll 31 and permits the lever 29 to be shoved outward by the coil spring 32 into position to bridge the contacts 24 and 25 through the engagement therewith of the bridging conductor plate 28. As soon as the lever 17 is moved upward into locking engagement with the steering wheel 14, the roller 31 rides up out of the groove 21 onto the hub 20 and the lever 29 is thus swung on its pivot 30 a sufficient distance to move the bridge plate 28 out of engagement with the contacts 24 and 25, breaking the ignition circuit. Consequently, even should a thief free the steering gear by breaking off or sawing through the lever 17, so that the steering wheel 14 could be manipulated, it would still be impossible to operate the car since the ignition circuit remains broken until the hub of the lever has been rotated to such position that the connection between terminals 24 and 25 is reestablished by the outward movement of the bridge piece 28 as the roller 31 falls into the groove 21.

Various modified forms of construction will readily occur to those skilled in the art. Thus in Fig. 1 I have shown a modified form of lock 33 which serves to hold the steering gear in fixed position. It is adapted particularly to steering posts having brackets located well downward on the dash. In this form the locking bolt 34 is carried by the bracket 35 and constitutes a reciprocating member passing through steering column 12 into engagement with one of a series of recesses or holes 36 formed in the steering shaft 15 on which the handle 14 is mounted. In this case I have not shown a switch in the ignition circuit, but it is obvious that it could be associated with the rotary element of the lock in precisely the same manner as indicated in Fig. 1. In Fig. 8 I have shown a steering wheel 37 of the pivoted type for facilitating exit and entrance to and from the driver's seat. In such a construction as this the locking mechanism may be located on a bracket 38, adjacent the wheel in its sprung down position and serving to hold it in this position until released. In Fig. 5 I have shown a supplemental groove 39 which may be engaged by the lock bolt 22 when the lever 17 is in its normal position. This prevents mischievous tampering with the lever, but is otherwise unnecessary since the lever is held in position not only by gravity but also by the latching effect of the roller 31 and its spring 32.

Various other modifications will readily occur to those skilled in the art which do not depart from what I claim as my invention.

I claim:—

1. A steering gear lock for automobiles comprising a bracket mounted at one end upon the dashboard and engaging at its other end the steering post, in combination with a locking member supported on said bracket between the steering post and dashboard and engaging a steering wheel element, together with key operated means carried by the bracket for holding said member in locking position.

2. A steering gear lock comprising a bracket supporting the steering gear post and having a recessed area adjacent the latter, a locking claw pivoted to said bracket and normally lying in the recessed portion of the latter, but adapted to swing up into engagement with a spoke of the steering wheel, together with locking means carried by the bracket for holding said claw in such engaged position.

3. A steering gear lock comprising a bracket supporting the steering post, a locking member pivoted on said bracket and engaging a steering wheel element in locking position, together with locking mechanism on said bracket engaging the hub of said locking member to hold the same in locked engagement with the steering wheel.

4. A steering gear lock comprising a bracket supporting the steering post, a locking member pivoted on said bracket and engaging a steering wheel element in locking position, together with locking mechanism on said bracket engaging the hub of said locking member to hold the same in locked engagement with the steering wheel, in combination with an ignition circuit cut-out device carried by the bracket and means for automatically operating said cut-out device to break the ignition circuit when said locking member is in engaged position.

5. A steering gear lock comprising a bracket supporting the steering post, a locking member pivoted on said bracket and engaging a steering wheel element in locking position, together with locking mechanism on said bracket engaging the hub of said locking member to hold the same in locked engagement with the steering wheel, together with a cut-out device in the ignition circuit, said cut-out device having a movable element engaging the hub of said locking member and operated thereby to break the ignition circuit when the locking member is in engaged position.

6. A steering gear lock for automobiles comprising a member clampable to the steering post, and a locking member pivoted on said clampable member and movable into and out of locking engagement with the steering wheel member, together with a key-operated lock having a bolt engaging the pivoted end of the locking member for holding said locking member in steering-wheel engaging position.

7. A steering gear lock for automobiles comprising a member clampable on the steering wheel post, a locking member pivoted on said clampable member and adapted to straddle a spoke of the steering wheel, together with a key-operated lock associated with said pivoted locking member and having a bolt engaging the pivoted end of the locking member for holding the same in spoke-engaging position.

In testimony whereof I have signed my name to this specification.

RICHARD T. NEWTON.